US009659500B2

(12) United States Patent
Nagda et al.

(10) Patent No.: US 9,659,500 B2
(45) Date of Patent: May 23, 2017

(54) SAFETY MONITORING IN SYSTEMS OF MOBILE ASSETS

(75) Inventors: Paresh L. Nagda, Pleasanton, CA (US); Nathan Todd, Union City, CA (US); Beena Umashankkar, Fremont, CA (US)

(73) Assignee: Navman Wireless North America Ltd., Glenview, IL (US)

( * ) Notice: Subject to any disclaimer, the term of this patent is extended or adjusted under 35 U.S.C. 154(b) by 902 days.

(21) Appl. No.: 13/311,411

(22) Filed: Dec. 5, 2011

(65) Prior Publication Data

US 2013/0141228 A1 Jun. 6, 2013

(51) Int. Cl.
*B60Q 1/00* (2006.01)
*G08G 1/00* (2006.01)

(52) U.S. Cl.
CPC .................................... *G08G 1/205* (2013.01)

(58) Field of Classification Search
CPC .... G08G 1/205; G08G 1/096; G01C 21/3602; G01C 21/3664; G08B 21/12; G08B 25/002; G08B 25/009
USPC ............... 340/439, 936; 701/124, 29, 33, 83
See application file for complete search history.

(56) References Cited

U.S. PATENT DOCUMENTS 5,724,243 A 3/1998 Westerlage et al.
5,760,742 A 6/1998 Branch et al.
5,928,291 A 7/1999 Jenkins et al.
5,955,973 A 9/1999 Anderson
5,987,381 A 11/1999 Oshizawa
6,182,006 B1 1/2001 Meek
6,253,129 B1 6/2001 Jenkins et al.
6,330,499 B1 12/2001 Chou et al.
6,339,745 B1 1/2002 Novik
6,351,697 B1 2/2002 Baker
6,363,254 B1 3/2002 Jones et al.
6,370,475 B1 4/2002 Breed et al.
6,373,430 B1 4/2002 Beason et al.
6,405,126 B1 6/2002 Palomo et al.
6,430,496 B1 8/2002 Smith et al.
(Continued)

FOREIGN PATENT DOCUMENTS

GB 2505326 2/2014
GB 2505327 2/2014
(Continued)

OTHER PUBLICATIONS

International Preliminary Report on Patentability, International Appliction No. PCT/NZ2006/000043, Feb. 5, 2007.
(Continued)

*Primary Examiner* — Joseph Feild
*Assistant Examiner* — John Mortell
(74) *Attorney, Agent, or Firm* — Nelson Mullins Riley & Scarborough, LLP

(57) ABSTRACT

Systems and methods for safety monitoring are described. Mobile assets may receive safety monitoring notifications responsive to one or more safety criteria being met. A driver or other user of the mobile asset may be prompted to acknowledge the safety monitoring notification. If the user requests assistance or does not acknowledge the safety monitoring notification, notifications may be communicated to other individuals, e.g. supervisors. In this manner, the safety of, e.g. drivers in a fleet of vehicles may be monitored.

26 Claims, 10 Drawing Sheets

(56) References Cited

U.S. PATENT DOCUMENTS 6,456,207 B1 9/2002 Yen
6,526,341 B1 2/2003 Bird et al.
6,556,905 B1 4/2003 Mittelsteadt et al.
6,611,755 B1 8/2003 Coffee et al.
6,748,318 B1 6/2004 Jones
6,789,013 B2 9/2004 Annett et al.
6,832,153 B2 12/2004 Thayer et al.
6,845,317 B2 1/2005 Craine
6,865,457 B1 3/2005 Mittelsteadt et al.
6,892,131 B2 5/2005 Coffee et al.
6,904,359 B2 6/2005 Jones
6,965,876 B2 11/2005 Dabbiere
6,968,272 B2 11/2005 Knockeart et al.
7,026,985 B2 4/2006 Subbarao et al.
7,089,107 B2 8/2006 Jones
7,317,975 B2 1/2008 Woolford et al.
7,356,392 B2 4/2008 Hubbard et al.
7,389,198 B1 6/2008 Dimitriadis
7,394,403 B2 7/2008 Winkler et al.
7,437,225 B1 10/2008 Rathinam
7,489,993 B2 2/2009 Coffee et al.
7,558,564 B2 7/2009 Wesby
7,561,069 B2 7/2009 Horstemeyer
7,571,036 B2 8/2009 Olsen et al.
7,584,033 B2 9/2009 Mittelsteadt et al.
7,589,643 B2 9/2009 Dagci et al.
7,660,658 B2 2/2010 Sheynblat
7,778,773 B2 8/2010 Yaqub et al.
7,783,406 B2 8/2010 Rothschild
7,912,641 B2 3/2011 Osentoski et al.
7,941,258 B1 5/2011 Mittelsteadt et al.
8,134,496 B2 3/2012 Mizuochi et al.
8,149,137 B2 4/2012 Tanaka
8,275,490 B2 9/2012 Brusilovsky et al.
8,305,206 B2 11/2012 Miller et al.
8,306,739 B2 11/2012 Miller
8,340,904 B2 12/2012 Lin
8,386,145 B2 2/2013 Rothschild
8,635,530 B2 * 1/2014 Brugler .................. G06F 17/10
345/440
8,727,056 B2 5/2014 Nagda
2002/0126023 A1 9/2002 Awada
2002/0156558 A1 10/2002 Hanson et al.
2002/0183920 A1 12/2002 Smith et al.
2003/0163233 A1 8/2003 Song et al.
2004/0027258 A1 2/2004 Pechatnikov et al.
2004/0143466 A1 7/2004 Smith et al.
2004/0249545 A1 12/2004 Lu et al.
2005/0046594 A1 3/2005 Taylor
2005/0114014 A1 5/2005 Isaac
2005/0131597 A1 6/2005 Raz et al.
2005/0171660 A1 * 8/2005 Woolford .............. G06F 1/3203
701/29.3
2005/0171663 A1 8/2005 Mittelsteadt et al.
2005/0251330 A1 11/2005 Waterhouse et al.
2005/0264404 A1 12/2005 Franczyk et al.
2006/0047417 A1 3/2006 Tanabe
2006/0052918 A1 3/2006 McLeod et al.
2006/0111822 A1 5/2006 Simon
2006/0142913 A1 6/2006 Coffee et al.
2006/0164259 A1 7/2006 Winkler et al.
2007/0067086 A1 3/2007 Rothschild
2007/0135978 A1 6/2007 Kim et al.
2007/0179709 A1 8/2007 Doyle
2007/0185627 A1 8/2007 Mavreas
2007/0213887 A1 9/2007 Woodings
2007/0294033 A1 12/2007 Osentoski et al.
2008/0039991 A1 2/2008 May et al.
2008/0258890 A1 * 10/2008 Follmer ................ B60R 25/102
340/439
2008/0262670 A1 10/2008 McClellan et al.
2008/0275643 A1 11/2008 Yaqub et al.
2008/0287151 A1 11/2008 Fjelstad et al.
2009/0119006 A1 5/2009 Silver et al.
2009/0234578 A1 9/2009 Newby et al.
2009/0240427 A1 9/2009 Siereveld et al.
2009/0273489 A1 11/2009 Lu
2010/0004853 A1 1/2010 Siereveld et al.
2010/0007523 A1 1/2010 Hatav
2010/0088163 A1 4/2010 Davidson et al.
2010/0094539 A1 4/2010 Tomizawa
2010/0198491 A1 * 8/2010 Mays .................... B60W 30/09
701/124
2010/0271196 A1 10/2010 Schmitt et al.
2010/0299021 A1 11/2010 Jalili
2010/0312419 A1 12/2010 Woodings
2010/0332069 A1 12/2010 Tippy
2011/0077028 A1 3/2011 Wilkes, III et al.
2011/0148658 A1 6/2011 Murray et al.
2011/0161138 A1 6/2011 Keaveny et al.
2011/0178706 A1 * 7/2011 Pu ............................. B60R 1/12
701/469
2012/0030133 A1 2/2012 Rademaker
2012/0182159 A1 7/2012 Alipour
2012/0226440 A1 9/2012 Nagda
2012/0243686 A1 9/2012 Wesby
2012/0253670 A1 10/2012 Nagda
2012/0253888 A1 10/2012 Davidson
2012/0253889 A1 10/2012 Davidson et al.
2013/0130639 A1 * 5/2013 Oesterling ............ H04W 4/027
455/404.1
2013/0211660 A1 8/2013 Mitchell
2014/0025440 A1 1/2014 Nagda et al.

FOREIGN PATENT DOCUMENTS

JP 8221696 8/1996
JP 2002352389 12/2002
JP 2004245630 9/2004
WO WO2004059996 7/2004
WO WO2012118534 9/2012
WO WO2012134542 10/2012
WO WO2013085582 6/2013
WO WO2014014500 1/2014

OTHER PUBLICATIONS

International Search Report, International Appliction No. PCT/NZ2006/000043, issued on Jun. 27, 2006.

International Search Report, International Appliction No. PCT/EP2002/014778, issued on Dec. 15, 2003.

European Search Report, European Patent Application No. 06733138.9 filed Mar. 9, 2006, mailed Jul. 4, 2011.

International Search Report and Written Opinion, International Application No. PCT/US2011/059278, dated May 4, 2012.

International Search Report and Written Opinion, International Application No. PCT/US2011/059307, dated May 16, 2012.

International Search Report and Written Opinion, International Application No. PCT/US2013/028757, dated Sep. 30, 2013.

International Search Report and Written Opinion, International Application No. PCT/US2012/053648, dated Feb. 27, 2013.

Examination Report, United Kingdom Application No. GB1315405.9 filed Aug. 29, 2013, mailed Jun. 2, 2014.

Office Action, United Kingdom Application No. GB1315406.7 filed Aug. 29, 2013, mailed Feb. 24, 2015.

Patent Examination Report No. 1 issued on Sep. 16, 2015 in corresponding Australian patent application No. 2012348379, all enclosed pages cited.

* cited by examiner

SAFETY MONITORING IN SYSTEMS OF MOBILE ASSETS

TECHNICAL FIELD

Embodiments of the invention relate generally to in-vehicle navigation or communication systems, including embodiments used in vehicle fleet management systems. Embodiments may include safety monitoring in such systems.

BACKGROUND

The global positioning system (GPS) is a space-based navigation system including a network of orbiting satellites (called NAVSTAR). Although established for military applications by the U.S. Department of Defense, in the 1980s the system was made available for civilian use. When locked onto the signal of at least three satellites, a GPS receiver may calculate a 2D position (latitude and longitude). When locked onto the signal of at least four satellites, a GPS receiver may calculate a 3D position (latitude, longitude and altitude), subject to the accuracy of map information in the receiver and accuracy of the location calculation. The GPS also provides highly accurate timestamps.

When used in a vehicle and once a GPS navigation system has determined its location using signals from the orbiting satellites, the GPS navigation system may display a map and instruct a driver by providing graphical information, as well as via text or speech on how to get to a destination. GPS navigation systems may be used to navigate in unfamiliar areas with reduced risk of getting lost, subject to the accuracy of the location information and maps used by the GPS navigation system. When a driver becomes lost, valuable time is lost and the driver could become late for a delivery, appointment, or arrival at a work site.

Different businesses, such as shipping and distribution companies, cargo systems companies, maintenance, repair and operations (MRO) organizations, service vehicle operators, cable television operators, schools, construction companies, and the like may operate a fleet of mobile assets, such as cars or trucks, which may make use of navigation systems.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known circuits, control signals, timing protocols, software operations, or computer components have not been shown in detail in order to avoid unnecessarily obscuring the described embodiments of the invention.

Figure 1:
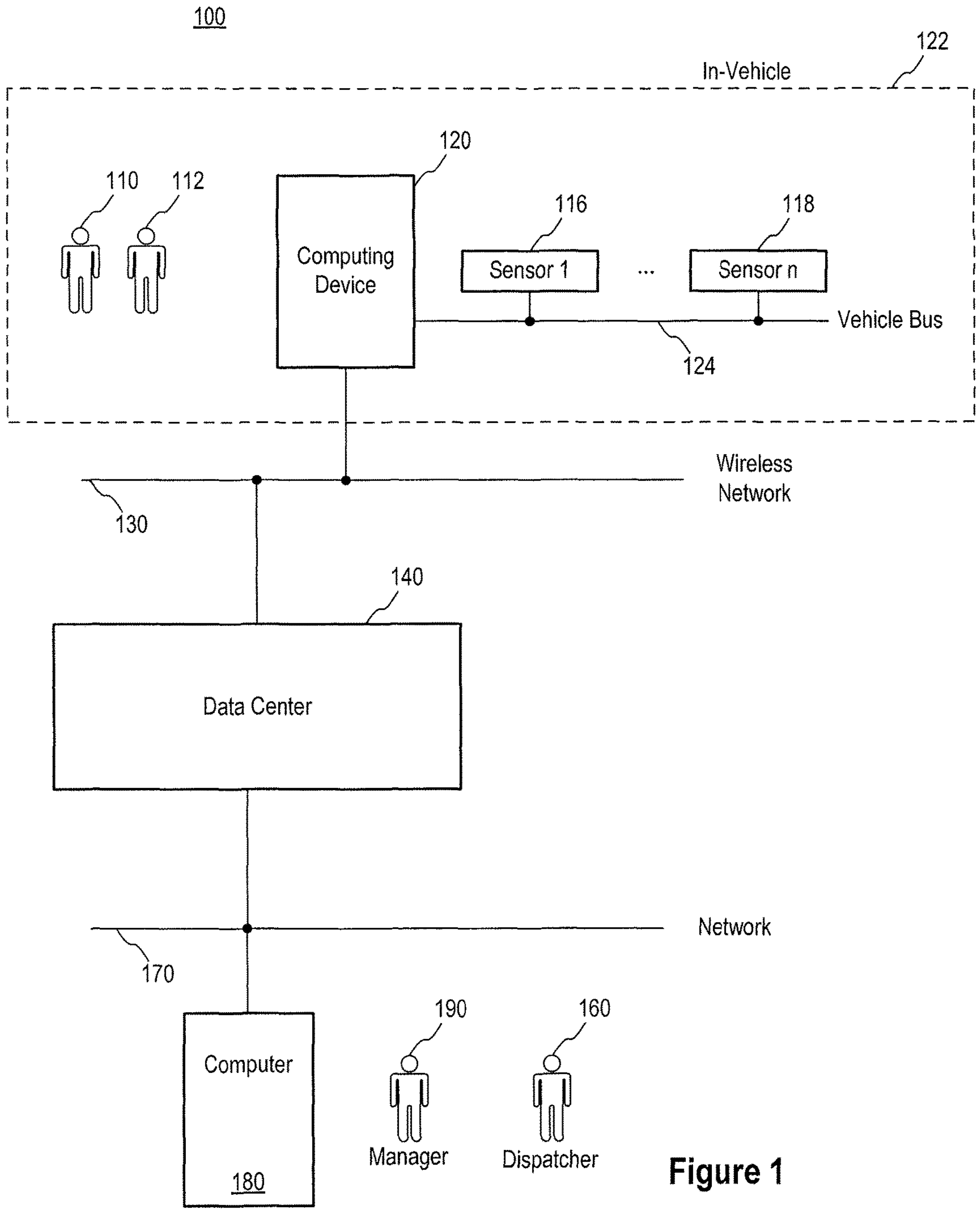
FIG. 1 is a schematic illustration of a system in accordance with an embodiment of the present invention.

FIG. 1 is a schematic illustration of a system in accordance with an embodiment of the present invention. The system 100 may include one or more assets (e.g. vehicle 122), a data center 140, and a computer 180. Any number of assets may be included in the system 100, and may be in communication with the data center 140 over a network, e.g. the wireless network 130 shown in FIG. 1. One asset, a vehicle 122, is shown in FIG. 1 as a representative asset. Assets may include any type of vehicle, e.g. a car, truck, motor vehicle (e.g., delivery truck, field service vehicle, school bus, company car, etc.), heavy equipment (e.g., garbage truck, cherry picker, street sweeper, tractor, etc.), or any other type of mobile device, e.g. an airplane or a mobile phone or other mobile computing device.

Vehicle 122 may be operated by driver 110 and optionally co-driver 112. Each asset in the system 100, including the vehicle 122, may be provided with a computing device 120. Driver 110 and/or co-driver 112 interface with the computing device 120 to communicate with the data center 140, as will be described further below. The computing device 120 may provide navigation and/or tracking functionality. The computing device 120 may include sensors, as will be described further below, and/or may be in communication with sensors in the asset, such as the vehicle 122. As shown in FIG. 1, the computing device 120 is in communication with sensors 116-118. The sensors 116-118 may include, for example, seat belt sensors that may detect whether seat belts within the vehicle are latched or open, door sensors that may detect whether a particular door, e.g. a passenger or driver door, is open, temperature sensors, fuel level sensors, acceleration or deceleration sensors, timers to log time intervals, e.g., hours on the road, vehicle ignition sensors to indicate if the vehicle ignition is on, door locked/unlocked sensors, airbag deployment sensors, impact/vehicle collision sensors, or vehicle speed and direction sensors. Other sensors may also be used. Sensors 116-118 may be used with control circuitry and actuators (not shown) to control vehicle ignition (e.g., start or turn off engine), adjust temperature in a truck or van, adjust vehicle speed (e.g., slow down), unlock doors, and the like. A vehicle bus 124 may connect sensors 116-118 to computing device 120. The vehicle bus 124 may be a wireless or wired bus for communicating data, commands, and optionally provide power (e.g., Controller Area Network (CAN) bus, On-Board Diagnostics (OBD-II), J-Bus, power bus, RS-232, RS-422, RS-484, universal serial bus (USB), 1-Wire, custom bus, etc.). Other types of communication interfaces between the computing device 120 and the sensors 116-118 may also be used.

The computing device 120 may include a global positioning system (GPS) receiver, as will be described further below. The computing device 120 may provide navigation system functionality. The computing device 120 may also provide messaging functionality. The computing device 120 generally is configured to communicate information about the driver 110 and/or the vehicle 122 to the data center 140, and receive information from the data center 140. For example, the computing device 120 may provide location information about the vehicle 122 to the data center 140, allowing a dispatcher 160 or manager 190 to be notified of a location of the vehicle 122, or indeed the location of any of the assets in the system 100. As will be described further below, in embodiments of the present invention, the computing device 120 may provide safety monitoring functionality. Information about the likely safety of the driver 110 and/or vehicle 122 may be communicated between the computing device 120 and the data center 140 in accordance with embodiments of the present invention.

In embodiments of the present invention, computing device 120 may determine a geographical location of the vehicle 122, for example using a Global Positioning System (GPS) receiver. In some embodiments, computing device 120 may display a notification, which may be a safety monitoring notification, to the driver 110 and/or co-driver 112 on a display. The safety monitoring notification may be displayed either at a predetermined interval, at a request of a dispatcher or manager, or responsive to a suspected safety incident. The computing device 120 may prompt a user, such as the driver 110 and/or co-driver 112 to acknowledge the safety monitoring notification. As will be described in more detail below, computing device 120 may also provide an acknowledgement, which may be a safety notification acknowledgement, which may be sent to data center 140. The computing device 120 may also provide an indication a notification has not been acknowledged to the data center 140.

Information, including, for example, acknowledgements, or indications of lack of acknowledgements, may be sent from the computing device 120 over a wireless network 130 to data center 140. In some embodiments the computing device 120 and the data center 140 may communicate using messages.

Wireless network 130 may be a local-area network (e.g., Wi-Fi (IEEE 802.11)), and/or wide-area network (e.g., "3G" (i.e., International Mobile Telecommunications-2000 (IMT-2000) (e.g., 3GPP Long Term Evolution (LTE), High-Speed Downlink Packet Access (HSDPA), High-Speed Uplink Packet Access (HSUPA), etc.)), "4G" (e.g., LTE Advanced and WirelessMAN-Advanced), WiMAX (IEEE 802.16m), CDMA2000 (e.g., 1×, 1×RTT, EV-DO Rev. 0, EV-DO Rev. A, and EV-DO Rev. B), global system for mobile communications (GSM) (e.g., general packet radio service (GPRS), and enhanced data rates for GSM evolution (EDGE) or Enhanced GPRS (EGPRS)), integrated digital enhanced network (iDEN), wideband integrated digital enhanced Network (WiDEN), advanced mobile phone system (AMPS), total access communication system (TACS), Extended Total Access Communication System (ETACS), Universal Mobile Telecommunications System (UMTS), and the like). Any other network suitable for communicating between the computing device 120 and the data center 140 may also be used.

The data center 140 may be configured to receive and/or transmit information over wireless network 130, store information, run applications, and/or provide information to external devices or locations. A dispatcher 160 or other user may utilize data stored at the data center 140 to view locations of assets in the system 100, and in embodiments of the present invention, may utilize data stored at or communicated to the data center 140 to monitor safety of the vehicle 122 and/or driver 110, or other assets or users in the system 100. Data center 140 may also be connected to and transfer data over network 170. Network 170 may be a wired (e.g., twisted pair, coaxial cable, optical fiber, etc.) and/or wireless (e.g., terrestrial microwave, communications satellites, cellular and PCS systems, wireless LANs, and/or infrared communications) computer network (e.g., the Internet). Although shown as a separate network in FIG. 1, in some examples, the networks 170 and 130 may be a same network.

Applications 144-148 and 152-156 may store the safety monitoring information provided to the data center 140 by the tracking device and navigation device 120. As will be described in more detail below, applications 144-148 and 152-156 may analyze safety monitoring information and produce output in various forms and formats for use by supervisor 160 and manager 190.

Computer 180 may be a workstation, computer, notebook computer, netbook computer, tablet computer, smart phone, PDA, and the like. Generally, computer 180 represents a computer through which a user, such as manager 190, may communicate with the data center 140. The computer 180 and/or the data center 140 may be configured to provide data analysis and reporting, which may be queried and/or viewed using the computer 180.

Figure 2:
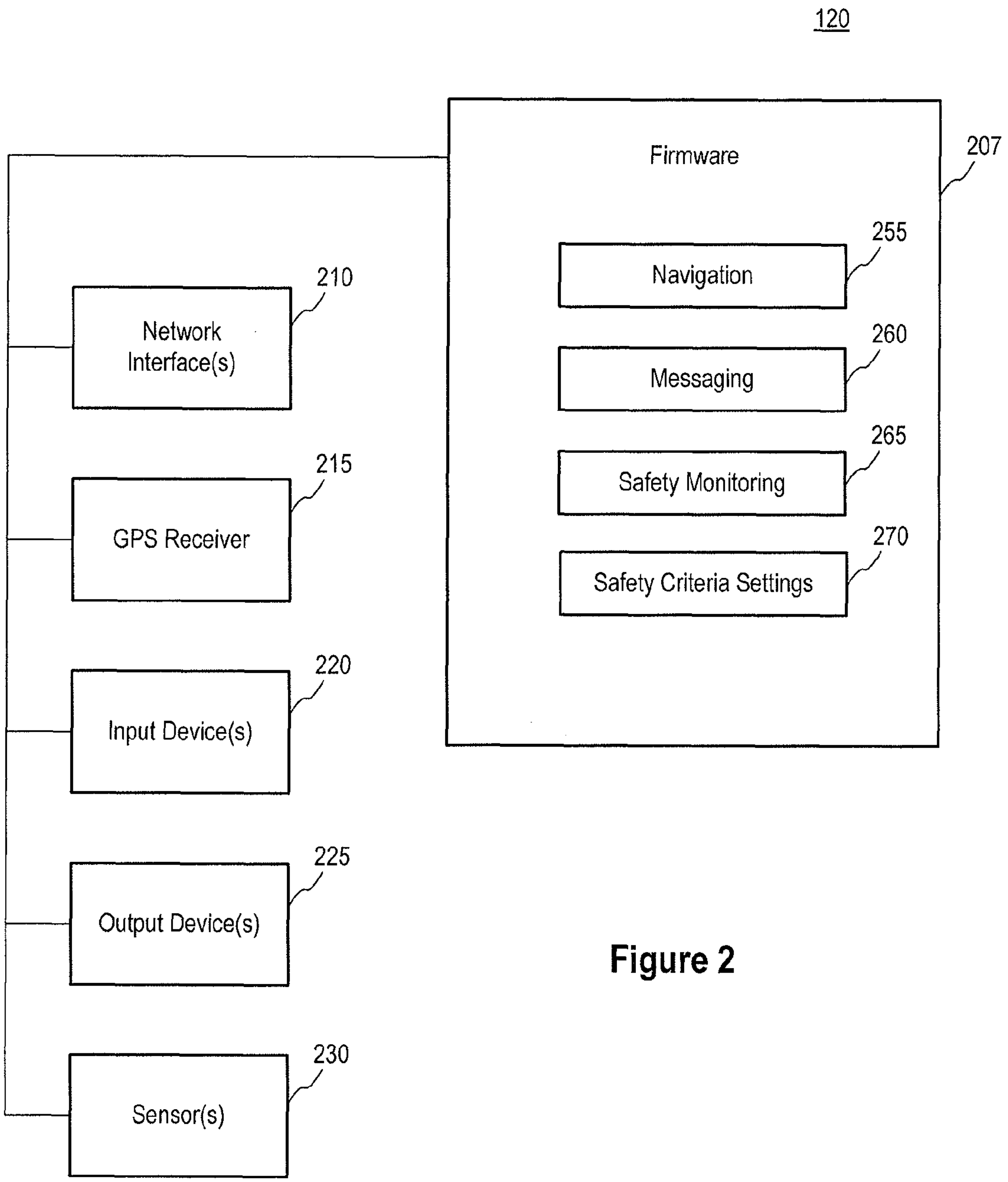
FIG. 2 is a schematic illustration of an example computing device arranged in accordance with an embodiment of the present invention.

FIG. 2 is a schematic illustration of an example computing device arranged in accordance with an embodiment of the present invention. The computing device 120 of FIG. 2 may be used in the vehicle 122 of FIG. 1. The computing device 120 may include firmware 207 that may control operation of various components of the computing device 120. Instead of firmware 207, in some examples software may be used to control components of the computing device 120, in which case one or more processors and computer readable mediums including executable instructions may be provided to perform the below functionalities, and in some examples combinations of firmware and software may be used.

The computing device may also include network interface (s) 210. For example, the computing device 120 may include one network interface for connecting to the wireless network 130 of FIG. 1, and another network interface for connecting to the vehicle bus 124 of FIG. 1. Referring again to FIG. 2, the computing device 120 may further include a GPS receiver 215, which may be used to receive GPS signals. The computing device 120 may also include one or more input devices 220 and one or more output devices 225. Input and output devices may include, for example, a keyboard, mouse, trackball, touchpad, microphone, touch screen, flat panel, electronic ink display, indicator lights, speaker, or the like. The computing device 120 may further include one or more sensors 230. The sensors 230 may be configured to monitor some aspect of the vehicle 122 of FIG. 1, and may be in communication with the vehicle bus 124 in some examples. Accordingly, sensors for monitoring performance of the vehicle 122 may be internal or external to the computing device 120. Settings for the sensors 230 may be provided by the firmware 207 in accordance with configuration settings, as will be described further below.

The firmware 207 may include memory, such as may be one or more volatile memory devices (e.g., RAM, SRAM, etc.), non-volatile memory (e.g., FLASH, EEPROM, etc.), magnetic media (e.g., hard disk drive), and/or removable media (e.g., compact disc (CD), digital versatile disc (DVD), Blu-ray disc (BD), USB, flash drive, secure digital (SD) memory card, secure digital high capacity (SDHC) memory card, etc.). for the firmware 207 may control components of the computing device 120 to perform navigation 255, messaging 260, and safety monitoring 265. Although shown as a single firmware unit 207 in FIG. 2, the firmware 207 may be implemented in some examples as combinations of firmware and software.

The computing device 120 may include memory that may store for example, stored messages, routes or other geographical information for use in navigation functionality, or other stored data.

It is to be appreciated that the precise configuration of the computing device 120 is quite flexible, and generally any combination of computer system components that may be used to provide the functionalities described herein may be used. The functionality may be implemented in hardware, firmware, software, or combinations thereof. In some embodiments, the computing device 120 may be implemented using multiple separate devices in communication with one another; e.g. a GPS device may be provided separately from remaining components of the computing device 120.

The computing device 120 may perform navigation functionality, such as by displaying routes and current position on an output device 225 of a display. Any typical function of a navigation system may be performed by the computing device 120 in some embodiments. The computing device 120 may provide messages to a network interface 210, for example for transmission to the data center 140 of FIG. 1. Messages may include, for example, vehicle position, data received from sensors, or safety acknowledgements, or an indication of lack of acknowledgement. for the computing device 120 may receive messages from the data center 140 and process the messages.

The firmware 207 may operate to cause the computing device 120 to display a safety monitoring notification and receive an acknowledgement of the safety monitoring notification or providing an indication the safety monitoring notification was not acknowledged. The firmware 207 may also operate to analyze data received from one or more sensors in the vehicle to identify a potentially hazardous condition, such as but not limited to, deceleration over a threshold (e.g. excessive braking), an unbuckled seat belt during vehicle motion, excessive idle times, or other potentially hazardous conditions. The potentially hazardous condition may be specified by one or more safety criteria settings 270 that may be implemented as configuration settings for the firmware 207.

Accordingly, the computing device 120 may utilize data from more than one sensor to identify a potentially hazardous condition, which may prompt display of a safety monitoring notification in some embodiments. For example, a seat belt sensor may indicate a seat belt is unbuckled and a speed sensor may indicate the vehicle is in motion, which may result in the display of a safety notification in some examples. Generally, data from one, two, three, four, five, six, or more sensors may be used, and the data combined to determine whether or not a potentially hazardous condition exists.

Figure 3:
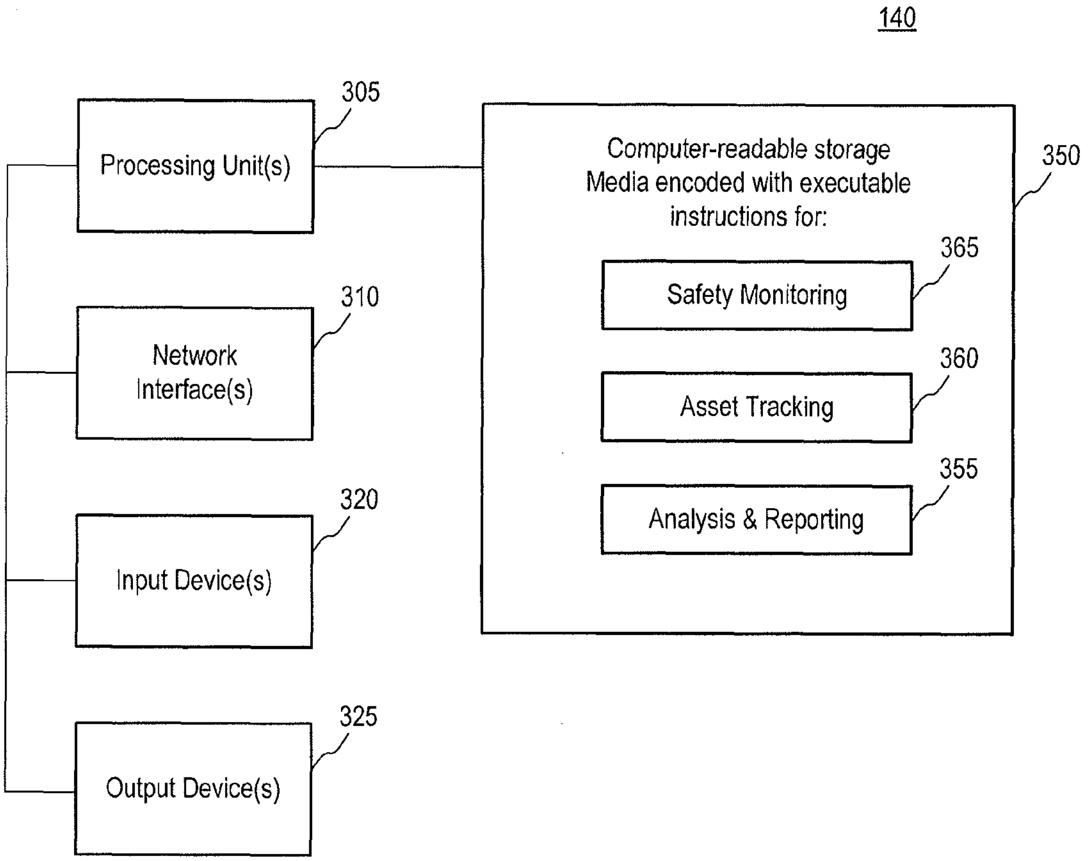
FIG. 3 is a schematic illustration of a portion of a data center in accordance with an embodiment of the present invention.

FIG. 3 is a schematic illustration of a portion of a data center in accordance with an embodiment of the present invention. The data center 140 may be used to implement the data center 140 shown in FIG. 1. The data center 140 may include one or more processing unit(s) 305. The processing unit(s) 305 may be one or more processors, such as but not limited to, an x86, SPARC, PowerPC, ARM, or the like. The data center may also include network interface(s) 310. For example, the data center 140 may include one network interface for connecting to the wireless network 130 of FIG. 1, and another network interface for connecting to the network 170 of FIG. 1. Referring again to FIG. 3, the data center 140 may also include one or more input devices 320 and one or more output devices 325, examples of which have been described above.

The data center 140 further includes computer-readable storage media 350. The computer-readable storage media 350 may include firmware and/or memory. The storage may be any of a variety of types of memory or storage media, examples of which have been described above with reference to the computing device 120 of FIG. 2. The storage media 350, which may be a single medium or multiple media, may be encoded with executable instructions for performing various functionalities, which will be described further below. The storage media 350 may operate in cooperation with the processing unit(s) 305 to perform the described functionalities. That is, the processing unit(s) may execute the instructions stored in the storage media 350. Examples of instructions that may be stored on the media 350 include instructions for safety monitory 365, instructions for asset tracking 360, and instructions for analysis and reporting 355. Although shown on a same medium 350 in FIG. 3, the instructions 355, 360, and 365, may be provided on separate media in some examples.

The data center 140 may include additional storage media in addition to the storage media 350 shown in FIG. 3. Data may be stored in the additional storage media, and/or in the media 350, which may include, for example, stored messages, stored sensor data, stored configuration files including safety configuration information, account data, or other information.

It is to be appreciated that the precise configuration of the data center 140 is quite flexible, and generally any combination of computer system components that may be used to provide the functionalities described herein may be used. The functionality may be implemented in hardware, firmware, software, or combinations thereof.

The executable instructions for safety monitoring 365 may include instructions for analyzing received sensor data from one or more of the assets in the system 100 of FIG. 1 to identify a potentially hazardous condition. Examples of sensor data that may be used to identify a potentially hazardous condition have been described above. In other examples, identification of a potentially hazardous condition may be performed by the asset, e.g. by the computing device 120 of FIG. 2, and the executable instructions for safety monitoring 365 may include instructions for receiving a message from the computing device 120. The executable instructions for safety monitoring 365 may include instructions for providing a message to an asset, such as the vehicle 122 of FIG. 1, that prompts a safety monitoring notification to be displayed by the computing device 120. Such a message may be provided responsive to determining a potentially hazardous condition exists, responsive to a request by a user, or on a routine basis. The executable instructions for safety monitoring 365 may further include instructions for receiving an acknowledgement of a safety monitoring notification from an asset, such as from the vehicle 122, or for receiving an indication that a safety monitoring notification was not acknowledged.

The executable instructions for asset tracking 360 may including instructions for receiving location information from multiple vehicles in a system, and storing, displaying, or otherwise utilizing the location information to track the assets in the system. The executable instructions for analysis and reporting 355 may include executable instructions for analyzing various of the data received by the data center 140 and presenting charts, graphs, or other arrangements of the data.

Figure 4:
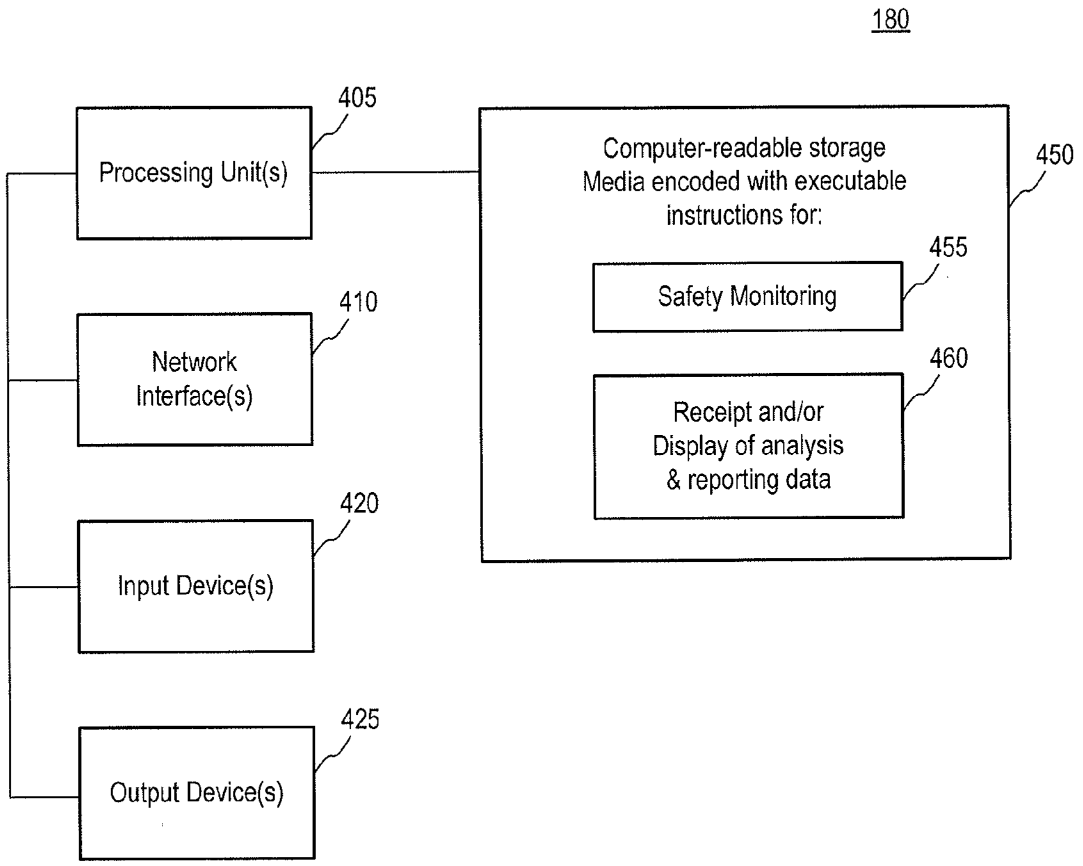
FIG. 4 is a schematic illustration of a computer configured for communication with a data center in accordance with an embodiment of the present invention.

FIG. 4 is a schematic illustration of a computer configured for communication with a data center in accordance with an embodiment of the present invention. The computer 180 may be used to implement the computer 180 shown in FIG. 1. The computer 180 may include one or more processing unit(s) 405. The processing unit(s) 405 may be one or more processors, such as but not limited to, those described above with reference to the processing unit(s) 305. The computer may also include network interface(s) 410. For example, the computer 180 may include a network interface for connecting to the network 170 of FIG. 1. Referring again to FIG. 4, the computer 180 may also include one or more input devices 420 and one or more output devices 425, examples of which have been described above.

The computer 180 further includes computer-readable storage media 450. The computer-readable storage media 450 may include firmware and/or memory. The storage may be any of a variety of types of memory or storage media, examples of which have been described above with reference to the computing device of FIG. 2. The storage media 450, which may be a single medium or multiple media, may be encoded with executable instructions for performing various functionalities, which will be described further below. The storage media 450 may operate in cooperation with the processing unit(s) 405 to perform the described functionalities. That is, the processing unit(s) may execute the instructions stored in the storage media 450. Examples of instructions that may be stored on the media 450 include instructions for configuration 455 and instructions for receipt and/or display of analysis and reporting data 460. Although shown on a same medium 350 in FIG. 3, the instructions 455 and 460, may be provided on separate media in some examples.

The computer 180 may include additional storage media in addition to the storage media 450 shown in FIG. 4. Data may be stored in the additional storage media, and/or in the media 450, which may include, for example, stored data received from the data center 140, stored analysis and/or reports, or other data.

It is to be appreciated that the precise configuration of the computer 180 is quite flexible, and generally any combination of computer system components that may be used to provide the functionalities described herein may be used. The functionality may be implemented in hardware, firmware, software, or combinations thereof.

The executable instructions for configuration 455 may include instructions for providing configuration information to the data center 140 and/or computing device 120. As will be described further below, a user of the computer 180, such as a manager 190 shown in FIG. 1, may configure the safety monitoring notifications described herein to determine how and when safety monitoring notifications may be sent. The configuration provided through the computer 180 may be used to configure safety notifications for one or multiple vehicles, for example, for all vehicles associated with a particular account, as will be described further below. Accordingly, the configuration provided through the computer 180 may result in adjustment of the configuration settings of the firmware 207 of the computing device 120 to monitor a particular safety criteria.

The executable instructions for receipt and/or display of analysis and reporting data 460 may include executable instructions for communicating with the data center 140 to request and/or receive data or analysis generated by the data center 140.

Figure 5:
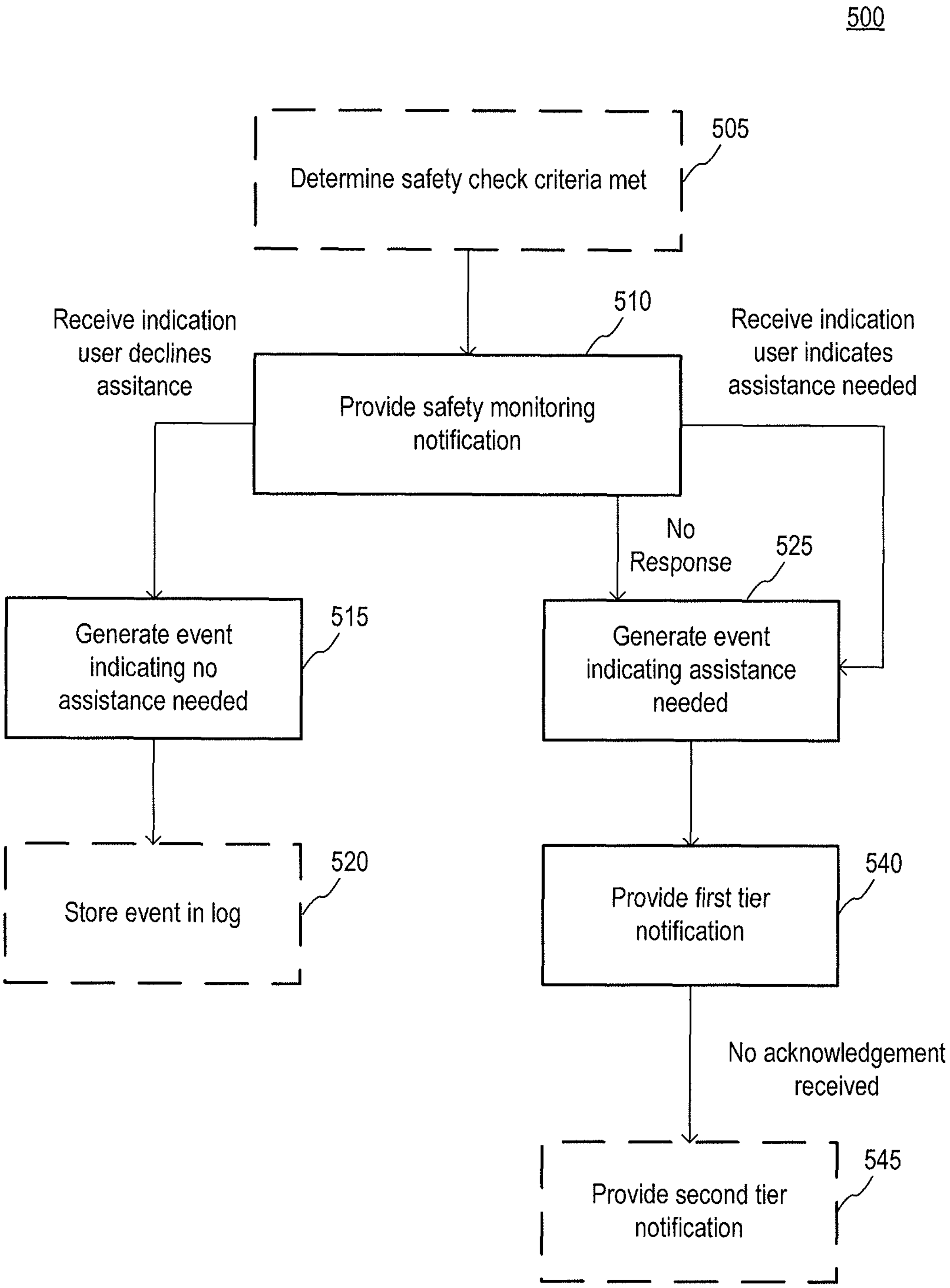
FIG. 5 is a flowchart of a method for safety monitoring in accordance with an embodiment of the present invention.

FIG. 5 is a flowchart of a method for safety monitoring in accordance with an embodiment of the present invention. The executable instructions for safety monitoring 365 encoded in storage media at the data center 140 and the firmware 207 of the computing device 120 may perform certain of the acts recited in FIG. 5. In other examples, t the acts may be performed by other devices.

Referring again to FIG. 5, the method 500 may begin at block 505 and determine a safety check criteria is met. Examples will be described further below, however in other embodiments no determination may be made, e.g. block 505 may be optional. The computing device 120 may determine a safety check criteria is met in accordance with settings of the firmware 207. In other embodiments, the data center 140 may determine a safety check criteria is met in accordance with instructions for safety monitoring 365. Block 510, provide a safety monitoring notification, may follow block 505. The safety monitoring notification, examples of which will be described below, may be provided by computing device 120 in some examples, or may be provided by the data center 140 to the computing device 120 in some examples, and may prompt a user to respond to the safety monitoring notification, e.g. by indicating whether or not assistance is needed.

A response may be received that a user has declined assistance and/or that no hazardous condition exists. The response may be provided to the computing device 120, and in some examples may be provided by the computing device 120 to the data center 140. Responsive to an indication that the user has declined assistance, the computing device 120, e.g. the firmware 207, may generate an event indicating that no assistance is needed in block 515. The event may be formatted as a standard event in accordance with any messaging technique, may be communicated to the data center 140, and may be stored by the data center 140 in a log in block 520.

A response to the safety monitoring notification may be received by the computing device 120 indicating a user has indicated assistance is needed and/or a hazardous condition does exist. Responsive to the indication the user needs assistance, in block 525, the computing device may generate an event indicating assistance is needed, e.g. using the firmware 207, which event may be communicated to the data center 140. Similarly, if no response to the safety monitoring notification is received after a predetermined time period, or an indication is received that the user has not responded to the safety monitoring notification after a predetermined time period, the computing device 120 may generate an event, e.g. using the firmware 207, indicating assistance is needed in block 525. The event may be formatted as a standard event in accordance with any messaging technique, and may be communicated to the data center 140.

Responsive to the event indicating assistance is needed, the data center 140 may provide a first tier notification in block 540. The first tier notification may require acknowledgement by another user, e.g. a dispatcher or manager. If no response to the first tier notification is received, in block 545, the data center 140 may provide a second tier notification in some examples.

Having described an overview of a method for safety monitoring in accordance with an embodiment of the present invention, further examples of various implementations of blocks of the method 500 of FIG. 5 will now be described.

In block 505, a determination may be made that a safety check criteria is met. The determination may be made by the data center 140, in which case the executable instructions for safety monitoring 365 may include instructions for determining that a safety check criteria is met. The safety check criteria may be stored in a computer readable storage accessible to the data center 140, which may, for example, be the computer readable storage 350. In other examples, the computing device 120 may determine if a safety check criteria is met. The firmware 207 of FIG. 2 may include settings for determining if a safety check criteria is met, and the safety check criteria may be stored in the firmware, e.g. settings 270.

Any of a variety of criteria may be evaluated in block 505. Examples include detection of harsh braking (e.g. deceleration above a threshold), detection of a rollover or collision event, excessive idle (e.g. a vehicle ignition is on, but the vehicle has not moved over a threshold distance in a predetermined time period), asset outside of predefined location (e.g. geo-fence), or other criteria. The safety criteria may be stored in the firmware 207 as safety criteria settings 270 accessible to the computing device 120. Accordingly, the firmware 207 may receive data from one or more sensors, such as the sensors 230 of FIG. 2 and/or the sensors 116-118 of FIG. 1. When the sensor data indicates a safety criteria has been met, the computing device 120 may generate a safety monitoring notification, in block 510 of FIG. 5 in accordance with the firmware settings. Alternatively or in addition, the firmware 207 provide an indication to the data center 140 that a safety criteria has been met. The act of determining that a safety criteria has been met in block 505 accordingly may involve a comparison of data from one or more sensors to threshold or boundary values, which may also be stored in the firmware safety criteria settings 270 of FIG. 2 or other storage accessible to the computing device 120. For example, geo-fences defining predetermined geographical areas may be stored and referenced to determine if a vehicle is outside the predetermined geographical area. In some examples, signals from multiple sensors may be used to determine if a safety criteria is met.

In some examples, no determination of sensor signals meeting a particular safety criteria is made. Instead, a safety monitoring notification may be provided in block 510 of FIG. 5 at predetermined time intervals, or at a request of a user of the data center 140 and/or computer 180 of FIG. 1, e.g. a dispatcher 160 or manager 190. The firmware 207 of FIG. 2 may specify an interval for providing safety monitoring notifications or may include instructions for providing a safety monitoring notification responsive to an external request. Examples of intervals for providing safety monitoring notifications include every hour, every two hours, every three hours, twice a day, or once a day, although other intervals may be used.

In block 510, a safety monitoring notification may be provided. The safety monitoring notification may be provided by the computing device 120 in accordance with the firmware 207 of FIG. 2, or may be provided by the data center 140 in accordance with the executable instructions for safety monitoring 365 of FIG. 3. The safety monitoring notification may take any of a variety of forms. The safety monitoring notification may be a visual notification displayed on a display of the computing device 120. The safety monitoring notification may additionally or instead include an audio notification provided by speakers of the computing device 120. The safety monitoring notification may also prompt a user to acknowledge the safety notification by, e.g. displaying response buttons, displaying response instructions, or playing audio instructions for a particular response from a user. An indication that a safety notification has been generated may also be provided to the data center 140.

Figure 6:
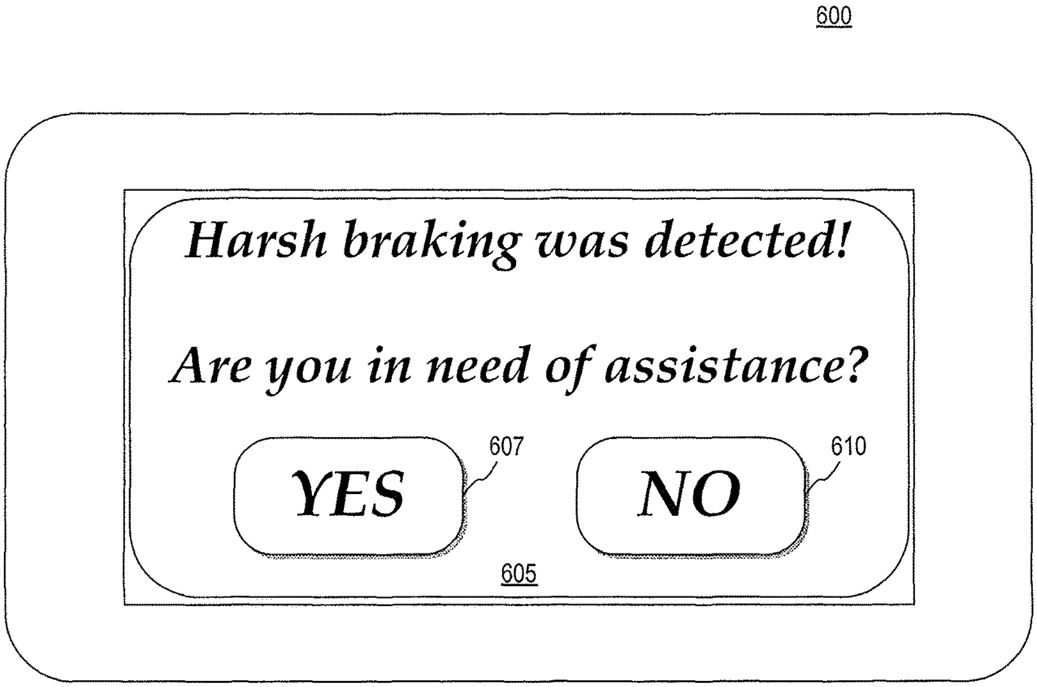
FIG. 6 is a schematic illustration of a computing device displaying a safety monitoring notification in accordance with an embodiment of the present invention.

FIG. 6 is a schematic illustration of a computing device displaying a safety monitoring notification in accordance with an embodiment of the present invention. The computing device 600 may be used to implement the computing device 120 of FIG. 1. The computing device 600 includes a touchscreen display, which may during normal use display a current location of a vehicle and/or navigation instructions in accordance with the firmware for navigation 255 of FIG. 2. When a safety monitoring notification is provided, for example, by the firmware 207 in accordance with the safety criteria settings 270, the safety notification 605 may be displayed on the touchscreen display, as shown in FIG. 6. The safety notification 605 may include an identification of the safety criteria that was met, if applicable (e.g. harsh braking was detected). The safety notification 605 may also include a prompt for response (e.g. Are you in need of assistance) and a mechanism for response (e.g. Yes button 607 and No button 610, which may represent different regions of a touch screen). In the example of FIG. 6, a user, e.g. a driver, may respond to the safety notification by touching the touchscreen in the location of the buttons 607 or 610. In other examples, other user input devices, e.g. a keyboard or mouse, may be used to respond to the safety notification. For example, the computing device 600 may include a physical button that may be pressed by a user (e.g. a driver) to respond to the safety notification. In other examples, an identity of the user may be confirmed prior to accepting a response to the safety notification (e.g. by requiring a password, biometric input, or other identity verifying measure).

The firmware 207 may be configured to suspend another activity of the computing device 120 responsive to generation or receipt of a safety notification. For example, the computing device 120 may display the safety notification 605 of FIG. 6 over the typically-displayed navigation interface, and may prevent access to the navigation information (e.g. typically-displayed map or position indicator) until the safety notification 605 is acknowledged.

Referring back to FIG. 5, if an indication is received that a user declines assistance the computing device 120 may generate an event indicating no assistance is needed in block 515. In the example of FIG. 6, when a user presses the No button 610, the computing device 600 may generate an event for messaging to the data center indicating no assistance is needed.

If an indication is received that a user requires assistance, the computing device 120 may generate an event indicating assistance is required in block 525. Similarly, if no response to the safety monitoring notification is received after a predetermined amount of time, the computing device may generate an event indicating assistance is required in block 525. Although shown as the same block, these events may be different in some examples to provide an indication whether the safety monitoring notification was affirmatively acknowledged or no acknowledgement was received. The event may be an electronic message that is formatted in accordance with an event-based messaging protocol, and the event may be communicated from the computing device 120 to the data center 140 over the network 130 shown in FIG. 1. The event may include other information, including but not limited to, an identification of the asset (e.g. vehicle), an identification of the driver, information regarding the asset (e.g. vehicle type, make, model), time, date, related safety criteria, vehicle location, or combinations thereof.

Events as described herein may include a variety of information, including current time, time of response, asset velocity, asset identifier, user (e.g. driver) identifier (associated with the asset), event type (e.g. initial event in response to user response, initial event in response to a lack of user acknowledgement, or user indicated no assistance needed).

Referring back to FIG. 5, responsive to receipt of the event indicating no assistance is needed, the data center may store the event in a log in block 520. In other examples, no action may be taken responsive to the event indicating assistance is not needed. Responsive to receipt of the event indicating assistance is needed (or that the safety monitoring notification was not acknowledged), the data center may provide a first tier notification in block 540. The first tier notification may take any of a variety of forms, including display of a notification on a display of the data center (e.g. an output device 325 of FIG. 3) or communication of the notification and display of the notification on a display of another computer (e.g. an output device 425 of FIG. 4). The first tier notification may include an email, telephone call, SMS message, or other communication to predetermined individuals or devices, and may be provided in accordance with the executable instructions for safety monitoring 365 of FIG. 3. The particular form and distribution list for a first tier notification may be stored in storage accessible to the data center 140, such as the storage media 350.

Figure 7:
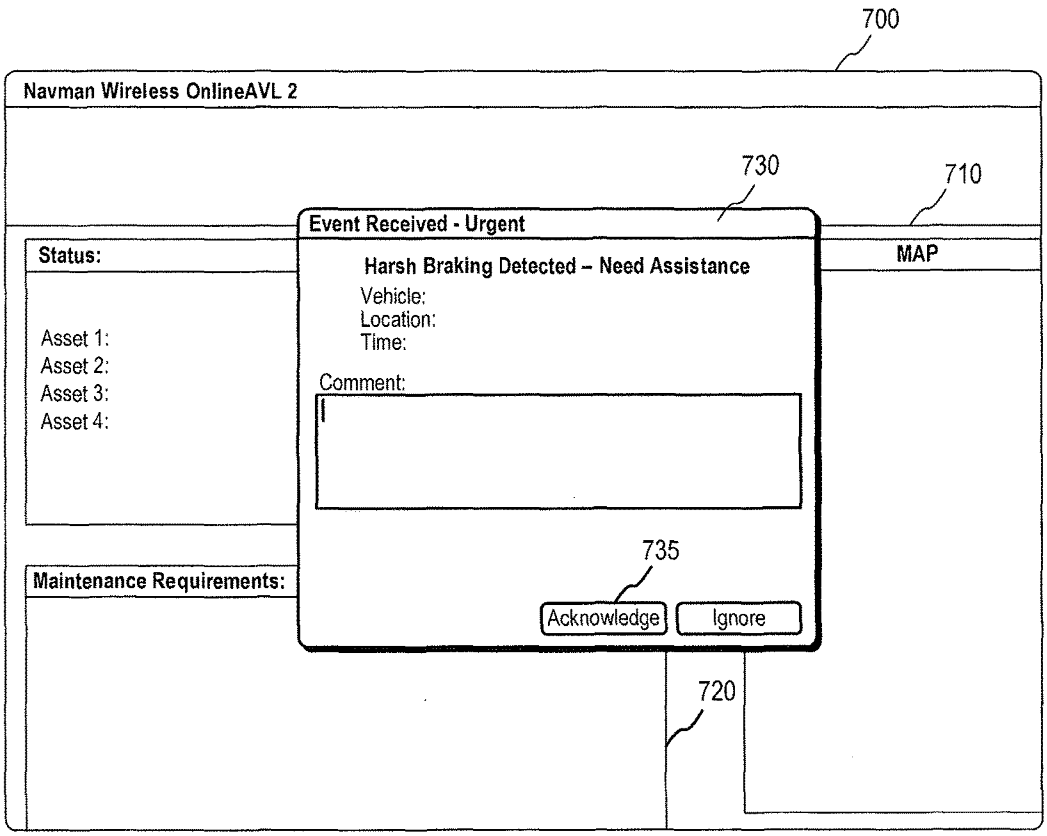
FIG. 7 is a schematic illustration of an example of a first tier notification in accordance with an embodiment of the present invention.

FIG. 7 is a schematic illustration of an example of a first tier notification in accordance with an embodiment of the present invention. A display 700 may be implemented as one of the output devices 425 of the computer 180 of FIG. 4 or as one of the output devices 325 of the data center 140 of FIG. 3. During normal operation, the display may display status related to assets in the system 100 of FIG. 1. For example, the display 700 may show a map or list indicating a position of multiple vehicles in the system in a region 710 shown in FIG. 7. Region 720 may show a list of requirements of vehicles the system, maintenance requirements in the example shown in FIG. 7, but other requirements may be displayed, e.g. scheduling or status information. Accordingly, during normal operation, a user (e.g. a manager or a dispatcher) may utilize the data center 140 and/or the computer 180 to view information received from assets in the system 100.

On receipt of an event indicating assistance needed, or an event indicating a safety notification had not been acknowledged, a notification 730 may be displayed on the display 700. The notification may display a safety condition prompting the notification (e.g. harsh braking detected), and may display an indication that a user had requested assistance (or an indication of failure to acknowledge a safety monitoring notification). Other information related to the event may also be displayed, as shown in FIG. 7, where a vehicle identification is included, a location of the vehicle, and a time. The notification 730 is provided as a 'pop-up' window in accordance with the executable instructions for safety monitoring 455 of the computer 180 and the executable instructions for safety monitoring 365 of the data center 140. Accordingly, a manager, dispatcher, or other user of the display 700 will be interrupted by the notification 730. The notification includes a prompt to acknowledge the notification, e.g. 'Acknowledge' button 735. The notification 730 also provides a region of receipt of a comment from the user. In this manner, a user of the display 700 may be alerted to a potentially hazardous situation occurring at one of the assets in a system. The user may take appropriate action, such as by trying other mechanisms to contact a driver or other person associated with the asset, contacting emergency personnel, or the like. While a pop-up notification is shown in FIG. 7, other forms of notification may be used, such as, but not limited to, email, SMS message, telephone call, or combinations thereof.

When a user responds to the notification 730 by, for example, clicking the acknowledge button 735 with a mouse or utilizing some other input device to acknowledge the notification, the acknowledgement may be communicated to the data center 140. If a user fails to acknowledge the notification 730 within a predetermined amount of time, a second tier notification may be provided, as shown in block 545 of FIG. 5. The second tier notification may be provided to a different device or user than the first tier notification, such as a manger, shift supervisor, director, or other personnel. Alternatively or in addition, the second tier notification may be provided in a different form, such as by interrupting a running process on the device to which it is transmitted, or a cellular telephone call, page, SMS text message or the like. The form and destination of the second tier notification may be determined by the data center 140 in accordance with settings stored in storage accessible to the data center 140.

In this manner, dispatchers, managers, or other personnel managing a fleet of assets may be able to asses the safety of their assets by directly obtaining information with drivers or other users associated with the assets. As described above, computing devices associated with a fleet of assets may generate and communicate events to a data center or other centralized location. As user may then access the stored events, for example over the web or other network. This often may be one of the best ways to information about safety, because it may come from a person who is directly observing the conditions around the asset, and can provide feedback about whether or not assistance is needed. Of course, if the situation is so hazardous, or injuries have occurred, feedback from a user may not be possible, and notifications may nonetheless be generated to alert someone at, e.g. a dispatch center. For example, worker safety may be of concern to managers of vehicles that may be working in hazardous conditions, e.g. a construction site or a mine. While it may be helpful to be monitoring the location and sensor signals from the various assets in a fleet, it may be particularly advantageous in some cases to hear from the worker directly that they do not require assistance. Accordingly, embodiments of the present invention may advantageously receive direct information from operators or other users of assets in fleet as to their safety condition.

Having described embodiments of safety monitoring notifications and first and second tier notifications above, examples of analysis and reporting that may be provided will now be described. As has been described above, drivers or other users associated with assets in a fleet may be prompted by a safety monitoring notification to respond that they either do or do not require assistance. Responsive events may be returned to a central data center from multiple assets within the system. Accordingly, the data center, such as the data center 140 of FIG. 1 may be receiving information about the conditions at a variety of assets, and may receive notifications when the driver or other user may require assistance. Over time and across assets, it may be useful to analyze this received data.

Accordingly, as mentioned above, the data center may include executable instructions for analysis and reporting 355. Information included in events received from assets in a system may be stored in a log or other format in storage accessible to the data center 140, which may be the computer-readable storage 350 of FIG. 3, or other storage may be used. The executable instructions for analysis and reporting may include instructions for presenting the data in various forms, including a frequency of incidents according to vehicle type, driver or other user, location, time of day, time of year, or the like. A user of the data center 140, e.g. the dispatcher shown in FIG. 1, or a user of the computer 180, e.g. a manager shown in FIG. 1, may review the data or query the data using the data center 140 or the computer 180. For example, the executable instructions for receipt and/or display of analysis and reporting data 460 may include instructions for receiving a data query and communicating the data query to the data center 140, receiving returned analysis data, and displaying it on an output device 425 of the computer 180.

Figure 8:
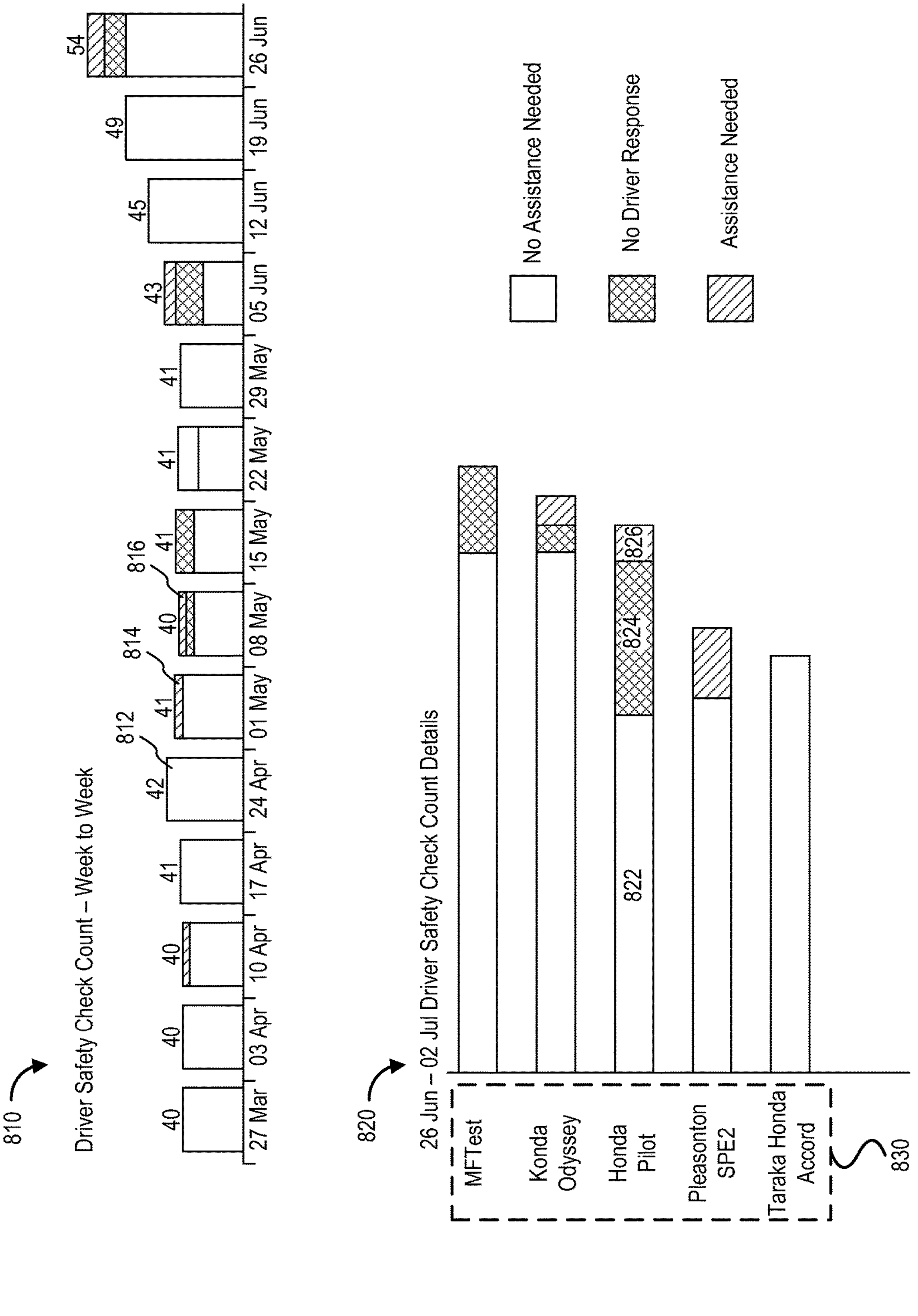
FIG. 8 is a schematic illustration of graphs that may be generated in accordance with the executable instructions for analysis and reporting 355 of FIG. 3.

In this manner, a manager may be able to readily identify particular users, assets, locations, or times that give rise to an unusual number of safety incidents, and may be able to take an appropriate remedial action. FIG. 8 is a schematic illustration of graphs that may be generated in accordance with the executable instructions for analysis and reporting 355 of FIG. 3. The graphs may be displayed on an output device 325 of the data center 140 or may be displayed on an output device 425 of the computer 180 of FIG. 4.

Referring again to FIG. 8, graph 810 illustrates a number of safety monitoring notifications that were sent each week. Each bar illustrates a number of notifications where no assistance was needed, e.g. portion 812, a number of notifications where no driver response was received, e.g. portion 814, and a number of notifications where assistance was needed, if applicable, e.g. portion 816. In this manner, a manager may be able to identify a particularly problematic week or other interval of time.

Graph 820 illustrates safety monitoring notifications provided to each of a variety of vehicle types 830. Each bar illustrates a number of notifications where no assistance was needed (e.g. portion 822), a number of notifications where no driver response was received (e.g. portion 824), and a number of notifications where assistance was needed (e.g. portion 826), each as applicable. In this manner, a manager may be able to identify a particularly problematic vehicle type of vehicle types 830. Graph 820 may also illustrate a frequency of assistance requests across categories in addition to vehicle types 830, such as different users, different locations, and the like.

Figure 10:
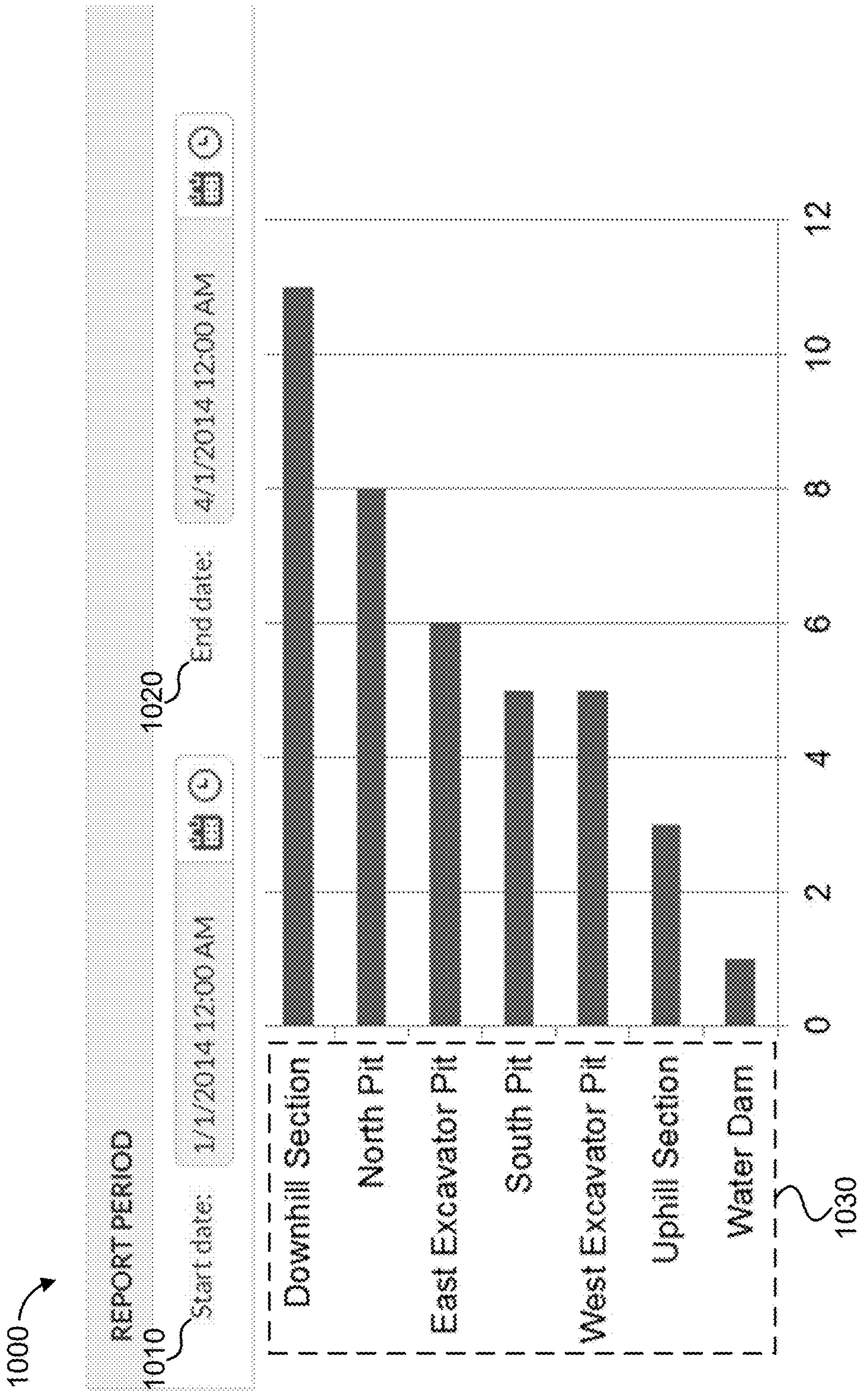
FIG. 10 is a schematic illustration of a graph that may be generated in accordance with the executable instructions for analysis and reporting 355 of FIG. 3.

By way of non-limiting example, FIG. 10 is a schematic illustration of a graph 1000 showing a frequency of safety monitoring notifications—a number of safety monitoring notifications that were sent in a time period (e.g., a time interval beginning at start date (and time) 1010 and ending at end date (and time) 1020). Each bar illustrates a number of notifications received at a respective location of locations 1030. In this manner, a manager may be able to identify a particularly problematic location.

Accordingly, analysis and reporting functions have been described that may present data stored in a location accessible to a data center to a user. As has been described above, the data center may receive messages from a plurality of assets within a system, such as vehicles. The data center may receive messages pertaining to the acknowledgement of a safety monitoring notification or lack thereof. Accordingly, the analysis and reporting functions may allow for an assessment of the relative safety of different assets, locations, users, or the like.

Having described analysis and reporting functionalities according to embodiments of the present invention, configuration functionalities will now be described that may be included in examples of systems and methods described herein.

As described above, recall a computing device 120 may provide a safety monitoring notification responsive to one or more safety criteria being satisfied. Embodiments of the present invention may allow for configuration (e.g. selection of those safety criteria) by a manager or other user using one or more of data center 140 (FIG. 3) and computer 180 (FIG. 4). The particular configuration of safety criteria may then be communicated to multiple assets within a particular fleet, such that the safety criteria being monitored and/or the frequency of safety monitoring notifications is configurable and may in some embodiments be dynamically changed by a manager or other user using one or more of data center 140 (FIG. 3) and computer 180 (FIG. 4).

Figure 9:
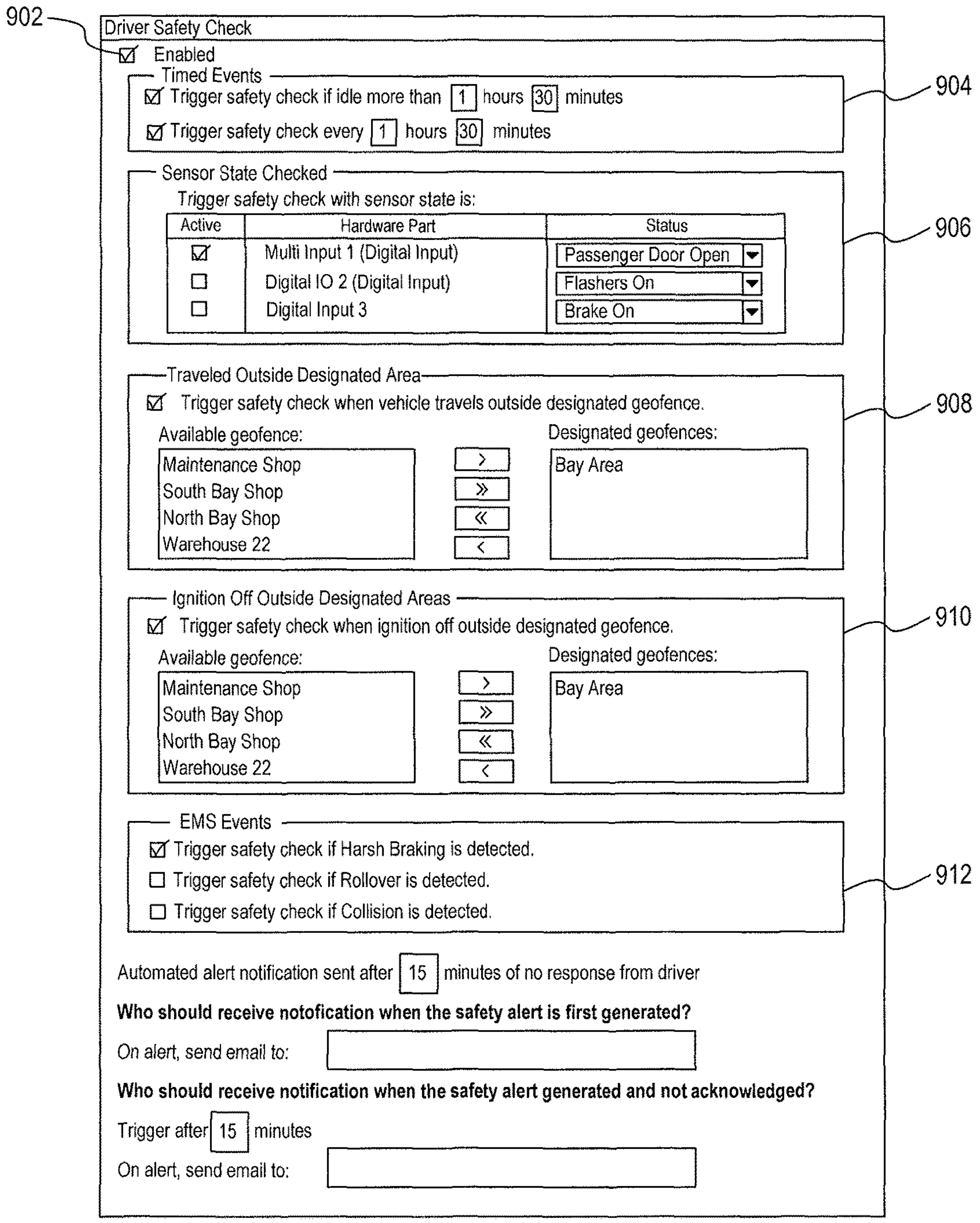
FIG. 9 is a schematic illustration of a user interface for configuration in accordance with an embodiment of the present invention.

The computer 180 of FIGS. 1 and 4 may including executable instructions for configuration 455. Alternatively or in addition, the data center 140 may also include executable instructions for configuration (not shown in FIG. 3). FIG. 9 is a schematic illustration of a user interface for configuration in accordance with an embodiment of the present invention. The user interface 900 may be displayed on a display device, for example an output device 425 of the computer 180 of FIG. 4 of the output device 325 of the data center of FIG. 3. The user interface 900 may allow a user to select any number of configurations for the safety monitoring functionalities, examples of which are shown in FIG. 9.

Safety monitoring may be enabled by selecting checkbox 902. In this manner, a user may elect to have safety monitoring for all or portions of assets in a particular fleet. It may be desirable to sometimes disable safety monitoring to not send safety monitoring notifications an avoid bothering a driver or other user with unnecessary safety monitoring notifications. A user may configure timed safety monitoring criteria in region 904, sensor-triggered safety monitoring criteria in region 906, location-related safety monitoring criteria in region 908, and a combination safety monitoring criteria in region 910, and emergency safety monitoring criteria in region 912.

The region 904 may allow a user to configure timed safety monitoring notifications, by specifying an interval for a timed safety check (e.g. every 1 hour 30 minutes as shown in FIG. 9), or a timed safety check for when a particular sensor value has been at a state for a threshold time (e.g. ignition off for more than 1 hour 30 minutes as shown in FIG. 9). The region 906 may allow a user to configure sensor-related safety monitoring criteria, by having the computing device generate a safety monitoring notification when particular sensors have a particular status. As shown in the region 906, a list of hardware ports and their associated status may be listed, allowing a user to select a combination of sensors and their associated status desired to trigger a safety monitoring notification. In the example shown in FIG. 9, a passenger door sensor has been selected, and will trigger a safety monitoring notification when the passenger door is open. Other example sensors shown, which may be used individually or in combination to generate a safety monitoring notification, include a flasher sensor and a brake sensor.

The region 908 may allow a user to configure location-related safety criteria, e.g. if an asset travels outside a predefined geographic location (e.g. a geofence). A particular geographic location may be selected and the user can indicate a safety monitoring notification should be generated if the asset is outside the area. In the example of FIG. 9, a safety monitoring notification would be triggered if a vehicle was outside the area defined as the 'Bay Area'. The region 910 may allow a user to configure a combination sensor and location safety monitoring criteria. In particular, a user may enable triggering of a safety monitoring notification when the ignition is off outside of a particular geographic location. In the example of FIG. 9, a safety monitoring notification would be triggered if a vehicle sensor indicated the vehicle ignition was off and the vehicle was outside the predetermined location defined as the 'Bay Area'.

The region 912 may allow a user to configure emergency-related safety monitoring criteria. As shown in FIG. 9, examples of emergency-related safety monitoring criteria include harsh breaking (e.g. through detection of deceleration above a threshold amount and/or for longer than a threshold time period), rollover detection (e.g. through accelerometer sensor readings), and collision detection (e.g. through deceleration detection).

The user interface 900 may also include a region for configuring a time for a user to respond to a safety monitoring notification before an event is generated and communicated to the data center reporting the lack of acknowledgement. In FIG. 9, the time selected is 15 minutes, however, other time periods may also be used. The user interface 900 may also include a region for specifying the type and distribution list for the first and second tier notifications described above. Moreover, a time for response to the first tier notification may be configured that specifies the amount of time between sending the first and second tier notifications. In the example of FIG. 9, this time is 15 minutes, although other time periods may be selected. Although shown in a single user interface 900 in FIG. 9, the different regions shown may be divided between multiple screens in some examples, and not all regions may be included in every embodiment.

Once a user has made selections in the desired regions of the user interface 900, the selections may be communicated to the data center 140 of FIGS. 1 and 3 and/or the computing device 120 of FIG. 2. The information provided may be then or simultaneously provided to the computing devices of one or more assets in a fleet, e.g. all assets included in an account associated with the user may receive the configuration selections. The notification settings may be stored storage accessible to the data center 140 for use in providing first and second tier notifications as described above. The safety criteria settings may be stored in storage accessible to the computing device 120 and/or the firmware 207 for use in evaluating safety criteria and generating safety monitoring notifications as described above. In this manner, the configuration of the safety monitoring functionality described herein is functional and may be altered by a user.

From the foregoing it will be appreciated that, although specific embodiments of the invention have been described herein for purposes of illustration, various modifications may be made without deviating from the spirit and scope of the invention.

What is claimed is:

1. An apparatus for providing safety monitoring notifications comprising:
- a GPS receiver; and
- firmware configured, at least in part, to:
- evaluate safety criteria, the safety criteria including at least movement less than a threshold distance in a predetermined time period while an ignition is on;
- provide a safety monitoring notification responsive to the safety criteria being satisfied;
- generate a first event message indicating assistance is requested in response to receiving a first input from the user, the first input responsive to the safety monitoring notification and indicating assistance is requested; and
- generate a second event message indicating that no assistance is requested in response to receiving a second input from the user, the second input responsive to the safety monitoring notification and indicating no assistance is requested;
- cause transmission of the first event message or the second event message to a data center.

2. The apparatus of claim 1, wherein the apparatus is configured to provide the first event message to the data center over a network.

3. The apparatus of claim 1, wherein the safety criteria includes include a sensor state, and the apparatus of claim 1 further comprising at least one processing unit configured to receive a sensor signal indicative of the sensor state.

4. The apparatus of claim 1, wherein the safety criteria include a combination of sensor signals.

5. The apparatus of claim 1, wherein said provide a safety monitoring notification comprises display the safety monitoring notification on a display.

6. The apparatus of claim 5, wherein said display comprises a touchscreen, and wherein the first input is received in response to the user touching a predetermined location of the touchscreen.

7. The apparatus of claim 5, wherein the apparatus further comprises a button, and wherein the first input is received in response to the user pressing the button.

8. The apparatus of claim 5, wherein the firmware is further configured to cause the apparatus to generate a third event responsive to a lack of response to the safety monitoring notification.

9. The apparatus of claim 1, wherein the safety criteria further include at least one of harsh braking, a rollover, a collision, and being outside a predefined location.

10. The apparatus of claim 1, wherein said first event comprises a message including a present location of the apparatus.

11. A method for monitoring a plurality of mobile assets, wherein individual ones of the mobile assets include a computing device, the computing device providing safety notifications and receiving input from a user responsive to the safety notifications, the method comprising:
- receiving an event message responsive to safety notifications from individual ones of the mobile assets, the event message indicating assistance is requested in response to the computing device receiving a first input from the user indicating that assistance is requested, and indicating no assistance is requested in response to the computing device receiving a second input from the user indicating that no assistance is requested, the event message including an identification of the respective asset providing the event message, the safety notifications being responsive to evaluation of safety criteria, the safety criteria including at least movement less than a threshold distance in a predetermined time period while an ignition is on;
- storing the event messages in electronic storage;
- providing information regarding assistance requests across different types of assets based, at least in part, on the stored event messages.

12. The method according to claim 11, wherein the information regarding assistance requests comprises a graph illustrating a frequency of the assistance requests.

13. The method according to claim 11, wherein the assets comprise vehicles and wherein the types comprise respective makes of the vehicles.

14. The method according to claim 11, wherein the event message further comprises an identification of a user associated with the asset, and wherein the information regarding assistance requests comprises a graph illustrating a frequency of assistance requests across different users using at least the stored event messages.

15. The method according to claim 14, wherein the assets comprise vehicles and wherein the users comprise drivers of the respective vehicles.

16. The method according to claim 11, wherein the event message further comprise a location associated with the asset at a time a respective event message was generated, and wherein information regarding assistance requests comprises a graph illustrating a frequency of assistance requests across different locations based, at least in part, on stored event messages.

17. The method according to claim 11, wherein the event message is received from the mobile assets over a wireless network.

18. The method according to claim 11, further comprising:

providing a first tier notification responsive to receipt of the event message indicating assistance was requested.

19. The method according to claim 18, wherein the first tier notification comprises a pop-up window notification.

20. The method according to claim 18, further comprising providing a second tier notification responsive to a failure to receive an acknowledgement of the first tier notification.

21. A method comprising:

determining, by a computing device associated with a vehicle, if a safety check criteria is met;

providing a safety monitoring notification to a user via an output device of the computing device associated with the vehicle, responsive to a determination the safety check criteria is met, the safety criteria including at least deceleration above a first threshold for a period of time exceeding a second threshold, and movement less than a threshold distance in a predetermined time period while an ignition is on;

in response to receiving a first input from the user declining assistance, generating a first event message indicating no assistance is requested, the first input being responsive to the safety monitoring notification, and storing the first event in a log;

in response to receiving a second input from the user requesting assistance, generating a second event message indicating assistance is requested, the second input being responsive to the safety monitoring notification, and providing a first tier notification responsive to the second event indicating assistance is needed;

in response to no response from the user to the safety monitoring notification being received after a predetermined time, generating a third event message indicating assistance is needed, and providing a notification responsive to the third event message indicating assistance is needed; and in response to no response to the first tier notification being received after a predetermined time, providing a second tier notification.

22. The apparatus of claim 9, wherein the harsh braking includes deceleration above a threshold rate, and the predefined location includes a geo-fence.

23. The method of claim 11, wherein the safety criteria further include at least one of harsh braking, a rollover, a collision, and being outside a predefined location.

24. The method of claim 21, wherein the safety criteria further include at least one of harsh braking, a rollover, a collision, and being outside a predefined location.

25. The method of claim 23, wherein the harsh braking includes deceleration above a threshold rate and the predefined location includes a geo-fence.

26. The method of claim 24, wherein the harsh braking includes deceleration above a threshold rate and the predefined location includes a geo-fence.

* * * * *